(12) United States Patent
Meyer

(10) Patent No.: US 9,891,341 B2
(45) Date of Patent: Feb. 13, 2018

(54) GRAVITY GRADIOMETER SYSTEM WITH SPHERICAL AIR BEARING BASED PLATFORM

(71) Applicant: Lockheed Martin Corporation, Bethesda, MD (US)

(72) Inventor: Thomas J. Meyer, Corfu, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1289 days.

(21) Appl. No.: 14/147,899

(22) Filed: Jan. 6, 2014

(65) Prior Publication Data

US 2016/0363689 A1 Dec. 15, 2016

(51) Int. Cl.
*G01V 7/16* (2006.01)
*G01V 7/08* (2006.01)
*F16C 32/06* (2006.01)
*G01V 7/04* (2006.01)

(52) U.S. Cl.
CPC ............ *G01V 7/16* (2013.01); *F16C 32/0614* (2013.01); *F16C 32/0696* (2013.01); *G01V 7/04* (2013.01); *G01V 7/08* (2013.01); *F16C 2370/00* (2013.01)

(58) Field of Classification Search
CPC ........................................................ G01V 7/16
See application file for complete search history.

(56) References Cited

U.S. PATENT DOCUMENTS 3,769,840 A 6/1973 Hansen
5,734,104 A 3/1998 Panenka
6,082,194 A * 7/2000 Gladwin ............... G01V 7/16
 73/382 G
6,837,106 B2 1/2005 Etkin et al.
7,225,553 B1 6/2007 Howard
7,788,975 B2 9/2010 Brett et al.
8,375,785 B2 2/2013 Metzger et al.
8,789,415 B2 7/2014 Van Kann
(Continued)

OTHER PUBLICATIONS

International Preliminary Report on Patentability for International Patent Application No. PCT/US2015/010318, dated Jul. 21, 2016, 6 pages.

(Continued)

*Primary Examiner* — Paul West
*Assistant Examiner* — Mark A Shabman
(74) *Attorney, Agent, or Firm* — Withrow & Terranova, PLLC

(57) ABSTRACT

A non-contacting spherical air bearing-based stable platform for use by a gravity gradiometer instrument (GGI) is provided by attaching a spherical ball-shaped bearing to a rotational stage of the GGI and integrating a concave spherical cup in the linear stage and mounting base assembly of the GGI which is fixedly attached to a host vehicle or platform. The spherical cup supports the spherical ball-shaped bearing on a thin cushion of air provided by a source of compressed air or gas at the concave surface of the spherical cup. The spherical ball-shaped bearing is supported, providing three degrees of rotational freedom of motion without the need for slip rings, flex capsules, races, or mechanical bearings, thereby reducing or eliminating gradient disturbance signals owing to parasitic torques and jitter in the output of the accelerometers of the GGI.

20 Claims, 5 Drawing Sheets

(56) References Cited

U.S. PATENT DOCUMENTS

| | | |
|---|---|---|
| 2006/0058961 A1 | 3/2006 | Chappell et al. |
| 2011/0175604 A1* | 7/2011 | Polzer .................. G01R 33/022 324/246 |
| 2011/0214503 A1 | 9/2011 | Dosch et al. |
| 2012/0210783 A1 | 8/2012 | Carroll et al. |
| 2013/0031975 A1 | 2/2013 | Moir |

OTHER PUBLICATIONS

International Search Report dated Apr. 7, 2015 for International Application No. PCT/US15/10318, filed Jan. 6, 2015.
Extended European Search Report for European Patent Application No. 15733270.1, dated Sep. 21, 2017, 7 pages.

* cited by examiner

GRAVITY GRADIOMETER SYSTEM WITH SPHERICAL AIR BEARING BASED PLATFORM

FIELD OF THE INVENTION

The application relates to gravity gradiometer instruments (GGI). More particularly, the application relates to suspension platforms for GGIs.

BACKGROUND OF THE INVENTION

Gravity sensors and gravity gradiometer instruments in particular, require stabilization for use on moving platforms or vehicles. Stabilization is the means for orienting the instrument in a preferred manner (typically aligned with a North-East-Down detached Earth survey reference frame) and for isolating the instrument from dynamic motion disturbances of its host vehicle. Transmission of motion disturbances from the host vehicle to the gravity instrument result in errors that cannot be completely removed by subsequent processing or by other means.

Host vehicles, airborne vehicles in particular, exhibit translational motion disturbances that are too large to be absorbed/accommodated by a conventional mechanical interface/suspension apparatus between an instrument and the vehicle. There is insufficient sway or rattle space to hold an instrument fixed inertially (e.g. in a desired survey frame) while its host vehicle moves (translates its position) around it. Rotational motion disturbances, however, can be accommodated by a suspension apparatus. Typically, a series of nested gimbals is used. Successive gimbals interconnect with one rotation axis per gimbal via mechanical bearings and races. An outer frame plus three successive inward gimbals provide rotational isolation from host vehicle angular motion disturbances. The outer frame sits atop pedestals and air springs which mount to the host vehicle, providing vibration isolation at frequencies above the natural resonance of this passive isolation arrangement. The outer frame is thus a linear motion stage. The gravity instrument mounts to the innermost gimbal structure. As such, the characteristic dimension of the sensor (proportional to its sensitivity) is much less than that of the overall volume occupied when deployed on a vehicle, thereby resulting in a sub-optimal configuration.

Angular motion disturbances are limited to tens of degrees (vehicle pitch and roll) so electrical continuity (for power and data) is maintained through each of the two outermost gimbals via flex capsules (resembling rotary ribbon cables) and through the innermost gimbal via slip rings due to its unlimited azimuth rotation capability. Care, maintenance, and replacement of the bearings, flex capsules, and slip rings reduces availability.

The use of ball bearings and races between gimbals gives rise to jitter disturbance torques applied to the gimbal structure supporting the gravity instrumentation. Jitter disturbances and jerk-like motions result from bearing stiction, which is the static friction that needs to be overcome to enable relative motion between objects in contact (in this case any pair of gimbals or outer gimbal and frame connected through mechanical bearings). Structural pieces pressing against one another (but not sliding) will require some threshold of force parallel to the contact surface to overcome static cohesion. Stiction is a threshold, not a continuous force. Shock or recoil-like "jitter" disturbances are imparted on the gravity instrumentation when bearing stiction is overcome. The ensuing angular rates imparted to the instrument are broadly referred to as jitter. Although jitter is a measurable effect (using gyroscopes co-mounted with the gravity instruments) the same disturbance also excites additional immeasurable error mechanisms. Alternative systems and methods in a gravity gradiometer instrument that reduce or eliminate such disadvantages are desirable.

SUMMARY

A gravity sensor or gravity gradiometer instrument (GGI) comprises an instrument block having an integral upper half of a spherical air bearing or ball supported in a non-contacting manner by a cushion of air above a bearing base which is integral to a linear motion stage. Thus, rotational isolation of the instrument from its host vehicle is provided. The spherical air bearing provides three axes of limited, but sufficient rotation in single-point configuration, thereby replacing the conventional arrangement of a series of nested gimbals and associated mechanical bearings and races, flex capsules and slip rings.

The gravity gradiometer instrument and supporting onboard components include a rotational stage, which is dynamically balanced so that translational motion of the linear stage supporting the rotational stage does not couple and produce inertial torques applied to the rotational stage. Inertial torques result in undesired rotation of the rotational stage and its sensors. The rotational stage is actively aligned or oriented to a desired survey frame by multiple non-contacting/non-coupling electromagnetic spherical actuators positioned physically/functionally between the linear and rotational stages.

The linear stage interfaces to a host vehicle via passive mechanical suspension/isolation system, (e.g., multiple air springs with integral viscoelastic dampers, mechanical helical coil springs plus damper elements, wire rope suspension with intrinsic friction damping, etc.). The linear stage may double as an environmental enclosure and allows for mounting of a pressurized air supply supplying the air bearing to the linear stage, avoiding the need for pneumatic lines between the linear stage and the host vehicle.

The instrument and platform comprise a symmetric and concentric arrangement wherein the linear stage, rotational stage, inertial sensors, actuation, enclosure, and passive suspension components share common centers of mass, stiffness, action, and bearing rotation. Gravity gradients are extracted at this common center point.

DETAILED DESCRIPTION

Conventional gravity gradiometer instruments (GGIs) use a three axis gimbal structure to hold and support the GGI on a host vehicle or platform. The gimbals provide degrees of freedom of motion, which allow the GGI to be oriented appropriately relative to the gravitational acceleration it is configured to measure. Gimbal suspensions include three interconnected gimbals which are coupled or connected to each other through rotational axes by mechanical means which require mechanical contact between the gimbal and its supporting structure. Mechanical contact of the gimbals with their corresponding supporting structures introduces disturbances or noise which is incorporated into the outputs of the accelerometers performing gravity gradient measurements in the GGI. These noise elements are frequently orders of magnitude larger than the gravity gradients the accelerometers are designed to detect.

Figure 1:
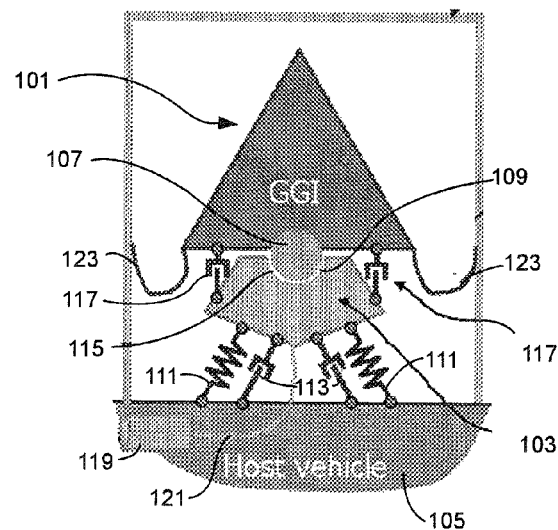
FIG. 1 is a simplified schematic block diagram of a GGI according to an embodiment of the present disclosure.

FIG. 1 shows a simplified schematic diagram of a GGI utilizing a non-contacting air bearing according to an embodiment of the disclosure. The GGI may be viewed as having two major components. The first component is a rotational stage 101 which includes an assembly having accelerometers which measure the gravity gradients for the GGI. The second component is a linear stage 103 which is connected to the platform or host vehicle platform 105 supporting the rotational stage 101. The linear stage 103 is coupled to the host vehicle or platform 105 by a passive interface including springs 111 and/or dampers 113. The rotational stage 101 includes a spherical or partially spherical bearing member 107 having a convex outer surface that corresponds to a concave spherical cup 109 which is integrally formed in a portion of the linear stage 103. The linear stage 103 includes an integral base including the spherical cup 109 that supports the upper spherical bearing member 107 which rests atop a thin cushion of fluid (air) 115 typically 5-10 microns thick. Due to the cushion of air 115 maintained between the spherical bearing member 107 and the spherical cup 109, the spherical bearing member 107 engages the spherical cup 109 without mechanically contacting the spherical cup 109. In other words, the rotational stage 101 is supported by the ball-and-socket-type junction created by the spherical air bearing but is practically free of rotational coupling given the nearly frictionless character of air bearings. Non-contacting/non-coupling spherical actuators 117 enable applying torque to the rotational stage to maintain its preferred survey orientation.

In one embodiment, a compressed air source 119 provides an air supply via pneumatic line 121 to spherical cup 109. The spherical cup 109 is configured to allow air to pass through the concave surface of the spherical cup 109 to form a cushion of air 115 that supports the spherical bearing member 107 without allowing the spherical bearing member 107 to contact the spherical cup 109.

In one embodiment, sensors and supporting electronics are housed within the rotational stage 101. Supporting electronics may include processors which extract gradient information from a number of accelerometers. According to an embodiment, the accelerometers are independent of each other, and each gradient measurement is processed to extract the gradient from each independent accelerometer. In other embodiments, accelerometers may be paired off and disposed about a common rotational axis. The outputs of the paired accelerometers are summed and processed to extract a gradient as understood by one of ordinary skill in the art. Because the rotational stage 101 does not contact the linear stage 103 which is physically connected to the host vehicle or platform 105, an umbilical cable 123 may be provided across the interface of the rotational stage 101 and linear stage 103. This provides for distribution of power and communication signals representative of the measured acceleration from the GGI. The umbilical cable 123 is configured to have minimal stiffness by material selection and routing to the rotational stage 101 and by minimizing the number and type of conductors in the umbilical cable 123 so as to avoid structurally "shorting" the two otherwise decoupled stages.

Figure 2:
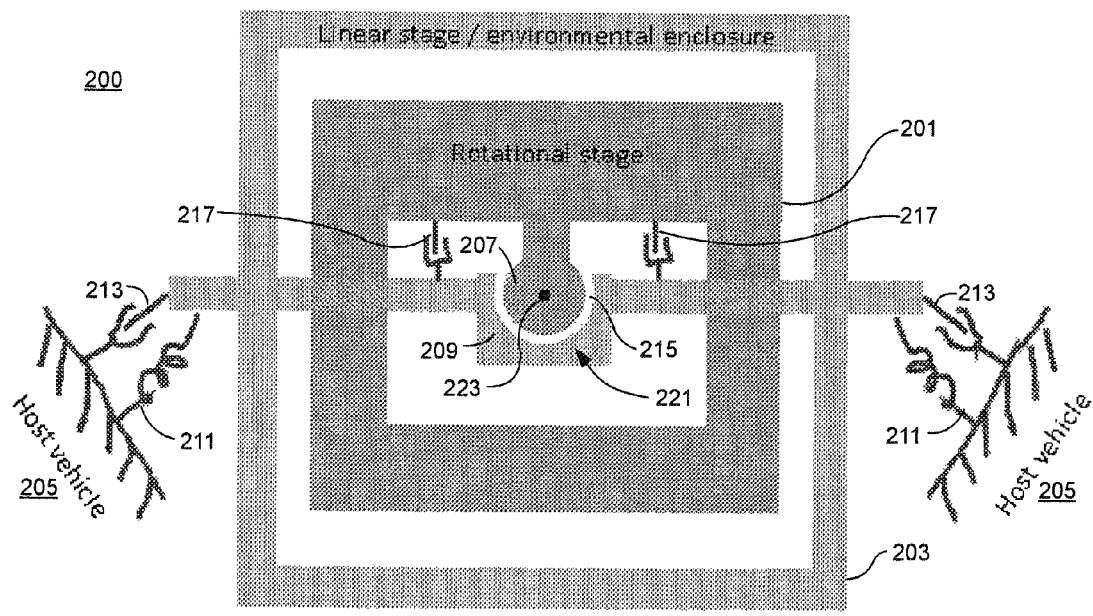
FIG. 2 is a block diagram of a GGI according to an embodiment of the present disclosure, illustrating the concentric center of motion of the rotational stage and the linear stage.

FIG. 2 shows a simplified schematic diagram of a GGI 200 illustrating the nominally concentric construction between the rotational stage 201 and linear stage 203. The linear stage 203 includes a base that is coupled to the host vehicle or platform 205 via spring mounts 211 and/or dampers 213. Integrated into the linear stage 203 is a spherical cup 209 configured to support a convex spherical bearing member 207 on a cushion of air of gas 215. In this way the rotational stage 201 is supported by the linear stage 203 at air bearing 221, but is rotationally decoupled. The sphere defined by the spherical bearing member 207 has a center 223 which is shared with a sphere defined by the concave spherical cup 209 integrated into the linear stage 203. Thus, the spherical bearing member 207 and the spherical cup 209 define spheres which share a common center 223, that is, they are concentric. Rotational stage 201 is configured to rotate about the common center 223, supported by a cushion of air or gas 215. In this way, spherical bearing member 207 does not contact spherical cup 209 integrated in the linear stage 203 and remains in a non-contacting state despite any translational motion of linear stage 203.

The center of rotation 223 allows the spherical bearing member 207 to simultaneously move in three rotational degrees of freedom, similar to conventional three gimbal support structures. However, this freedom of motion is provided in a non-contacting manner, and eliminates the need for ball bearings, races, flex capsules, and slip rings. Therefore, the mechanical disturbances caused by these types of connections are eliminated from the outputs of the accelerometers affixed to the rotational stage of the GGI. Spherical actuator 217 is configured to provide concentric pure torque to the rotational stage, whereby the center of actuation coincides with the rotational center of the spherical bearing as well.

Figure 3:
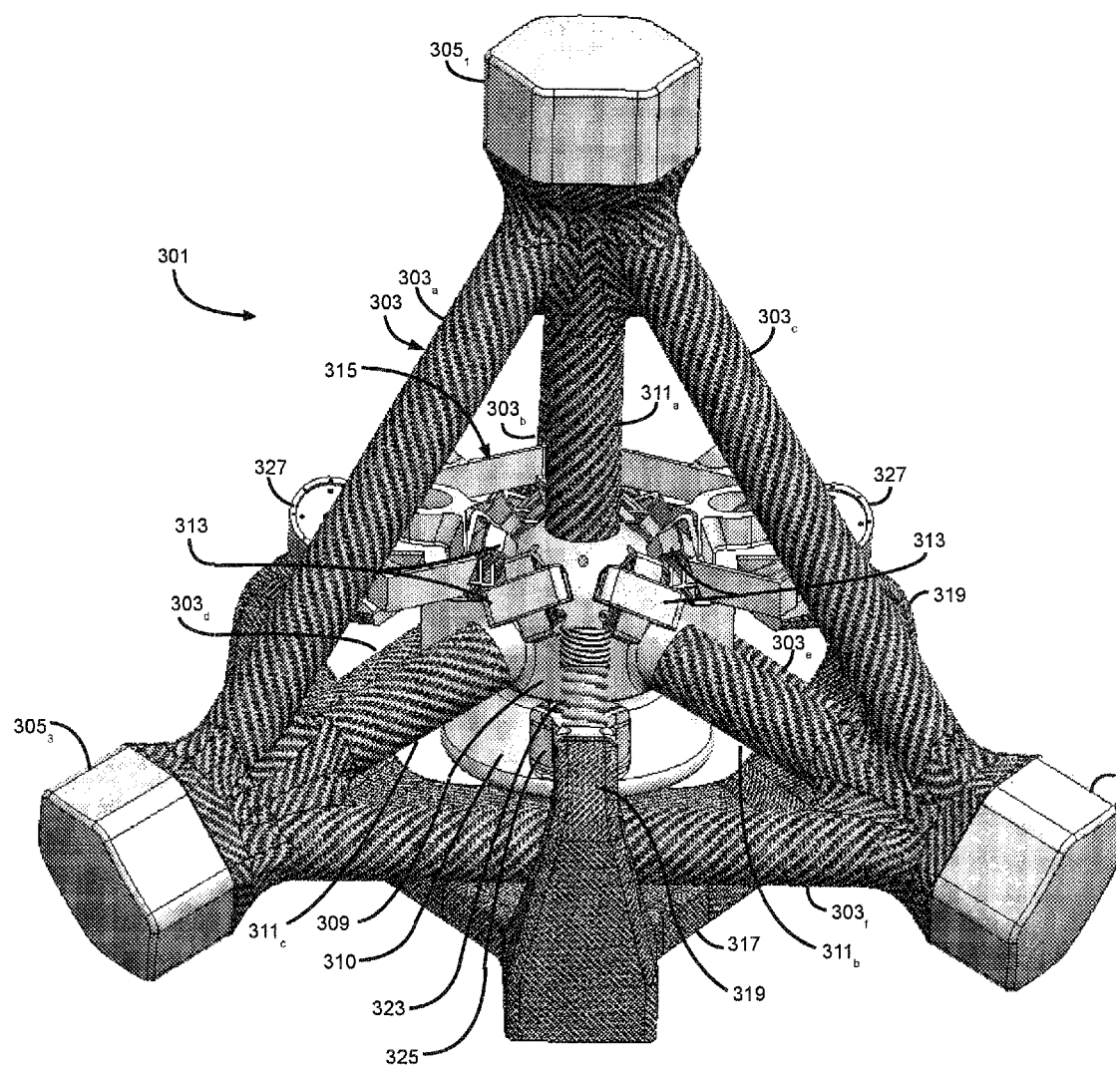
FIG. 3 is an isometric view of an embodiment of a GGI according to a non-limiting embodiment of the disclosure.

FIG. 3 is an isometric view of a GGI 300 according to an embodiment of the disclosure. According to the non-limiting embodiment illustrated in FIG. 3, a rotational stage 301 is embodied as a tetrahedral lattice or frame 303. At each vertex of the tetrahedral frame 303, a housing denoted generally as 305 which contains instrumentation for measuring gravity gradients, such as accelerometers 307 and other components including angular rate sensors (e.g., gyroscopes) and supporting control and processing circuitry (not specifically shown). Each vertex of the tetrahedral frame 303 includes an arm member 311 extending from the respective vertex to a central rotational hub 309. Housing $305_1$ is located at a first vertex of tetrahedral frame 303 which is defined by terminal portions of arm members $303_a$, $303_b$, $303_c$, and $311_a$. Housing $305_2$ is located at a second vertex of tetrahedral frame 303 which is defined by terminal portions of arm members $303_c$, $303_e$, $303_f$, and $311_b$. Housing $305_3$ is located at a third vertex of tetrahedral frame 303 which is defined by terminal portions of arm members $303_a$, $303_d$, $303_f$, and $311_c$. A fourth vertex which cannot be seen in the perspective shown in FIG. 3 is defined by terminal portions of arm members $303_b$, $303_c$, and $303_d$. In addition, a fourth central arm member corresponding to arm members 311$_a$, 311$_b$, and 311$_C$ has a terminal portion at the fourth vertex. Rotational hub 309 is located at the center of motion of the tetrahedral frame 303 and houses a spherical bearing member (107, shown in FIG. 1). The lower portion of rotational hub 309 extends into a rotational skirt 310 which surrounds and passes under the linear stage's spherical cup 325, as may be seen in greater detail in FIG. 4 and FIG. 5. The center of motion for the tetrahedral frame 303 corresponds to the center of the sphere defined by the spherical bearing. Spherical actuators 313 are attached to the outer walls of the hub 309 to provide attitude/alignment control of the tetrahedral frame 303 and accelerometers 307 housed therein. Spherical actuation is configured as part of a feedback control system to apply corrective torque inputs from the linear stage to the rotational stage in response to deviations of the rotational stage's orientation from a desired survey reference frame. A strapdown navigation subsystem as known in the art serves as a baseline configuration for computing the rotational stage's orientation, e.g., the output of an inertial measurement unit (IMU) directly affixed to the rotational stage is aided by satellite-based inertial reference systems such as the Global Positioning System (GPS). Additional sensors and data blending can be used for specific improvements to this baseline configuration, as will be understood by a person of skill in the art.

GGI 300 further includes a linear stage 315 which includes a hub portion 321 which houses a spherical cup 325 having a concave surface that supports the spherical bearing of the rotational stage 301 on a thin cushion of air such that the rotational stage 301 is supported by the linear stage 315 in a non-contacting manner.

The linear stage 315 and mounting base 317 assembly includes a mounting base 317 which is attached to a host vehicle or platform (not shown). The mounting base 317 has hook-shaped extensions 319. The hook shaped extensions 319 rise vertically from the base 317 and turn inward, parallel to the plane of the host vehicle or platform extending over the lower members 304 of tetrahedral frame 303. The hook shaped extensions 319 serve a physical limit to the rotational angle of rotational stage 301. During normal operations, the orientation of the rotational stage 301 is maintained such that the lower members 304 of the tetrahedral frame 303 do not contact the base 317 or hook shaped extensions 319. The extensions serve to contain the rotational stage 301 in the case of a drastic acceleration of the GGI; that is, for safety purposes and flight worthiness considerations. At the ends of the hook shaped extensions 319, the linear stage 315 is attached to the hook shaped extensions 319 by a helical spring or other coupling mechanism 323 thereby providing a passive suspension to the linear stage 315 relative to the host vehicle or platform and mounting base 317. Other means of isolating the linear stage 315 relative to mounting base 317 may be used to supplement helical springs 323. For example, active means, such as mechanical actuators or "stingers" 327 may be used to actively cancel specific tonal disturbances that would otherwise transmit from the vehicle through the mounting base 317 to the linear stage 315. The linear stage 315 houses spherical cup 325 which has a concave inner surface that supports the upper half of the air bearing, defined by the spherical ball-shaped bearing of the rotational stage 301. A supply of air (not shown) is provided to the concave surface of spherical cup 325 configured to provide a cushion of air that supports the spherical bearing and rotational stage 301 in a non-contacting manner, thereby eliminating the need for mechanical bearings, slip rings, races, and/or flex capsules.

Figure 4:
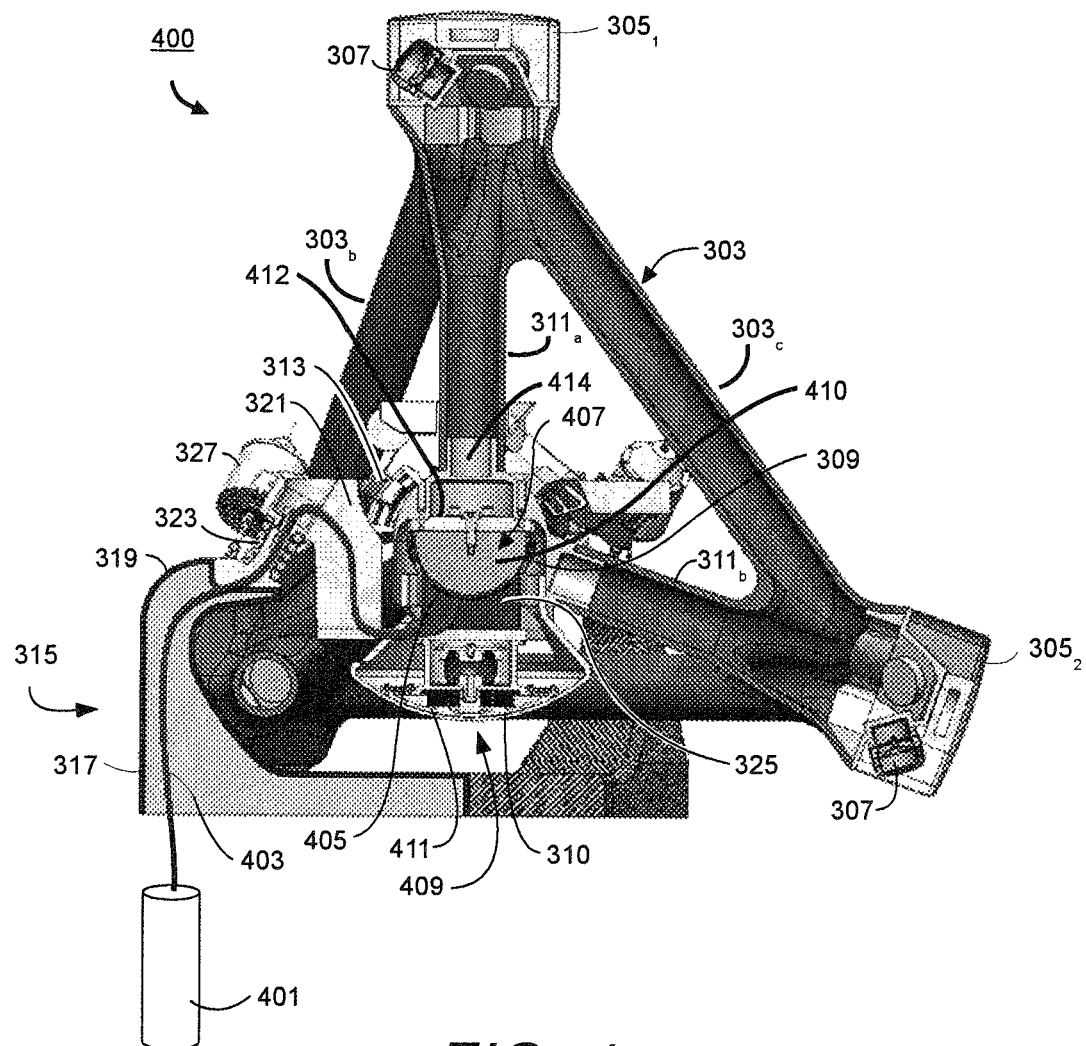
FIG. 4 is a partial cutaway of an elevation view of the GGI of FIG. 3 showing the non-contacting air bearing between the rotational stage and the linear stage according to an embodiment of the disclosure.

FIG. 4 is a schematic cross sectional view of the GGI shown in FIG. 3. Rotational stage 301 comprises a tetrahedral frame 303 constructed from arm members 303$_a$, 303$_b$, 303$_d$, and 303$_f$ visible from the perspective shown in FIG. 4. Center arm members 311 extend from vertices of the tetrahedral frame 303 to a central portion of rotational hub 309. Rotational hub 309 houses spherical bearing member 407 which forms an upper half of the rotational air bearing 400 supported in a non-contacting manner by a cushion of air above the bearing base which is integral to a linear motion stage. The spherical bearing member 407 includes an at least partially spherical portion 410 (e.g. hemispherical shaped) which extends into the spherical cup 325 in the linear stage 315 defining the lower half of rotational air bearing 400.

By way of non-limiting example, the structure shown in FIG. 4 defines portion 410 configured as a lower hemispherical outer or curved surface and a planar top surface 412 defined by the plane passing substantially through the sphere defined by partially spherical portion 410. A shaft 414 disposed perpendicular to the planar surface 412 of the spherical bearing member couples the planar surface 412 and at least partially spherical portion 410 to arm member 311$_a$ and ultimately, to tetrahedral frame 303 of the rotational stage 301. A compressed source of air or other suitable gas 401 is coupled to the spherical cup 325 via pneumatic line 403. Pneumatic line 403 introduces the air or gas to the concave surface of the spherical cup 325 and provides a thin cushion 405 of air between the spherical cup 325 and spherical bearing member 407 when the spherical bearing member 407 is engaged in the spherical cup 325. The thin cushion 405 of air supports the spherical bearing member 407 in a non-contacting manner with respect to the spherical cup, while allowing three degrees of rotational freedom to spherical bearing member 407 and attached rotational stage 301.

The center of mass of the rotational stage 301 is located substantially at the center of the sphere defined by at least partially spherical portion 410 of the spherical bearing member 407. Thus, the rotational stage 301 rotates about the center of mass, which is supported and rests upon air cushion 405. Accordingly, the center of rotation of the rotational stage is co-located with the center of mass of the rotational stage 301. This center of rotation coincides with the center of a sphere defined by spherical cup 325 when the spherical bearing member 407 is engaged in the spherical cup 325. In this way, the linear stage, which includes the spherical cup 325 and the rotational stage 301, are concentric, having a shared point at which the linear stage 315 supports the rotational stage 301, and the center of mass around which the rotational stage 301 rotates. The rotational stage 301 is supported by the linear stage 315 but is rotationally decoupled from it by air cushion 405, and is subsequently rotationally decoupled from the host vehicle.

While rotating, the rotational skirt 310 at the lower end of the rotational stage 301 moves in a pendulum motion under the linear hub 321. A brake mechanism 409 is configured to limit or stop motion of the rotational stage 301. The brake mechanism includes an extendable (and retractable) surface 411. Surface 411 may be selectively extended until it comes into contact with rotational skirt 310 to limit or stop motion of the rotational stage 301.

Figure 5:
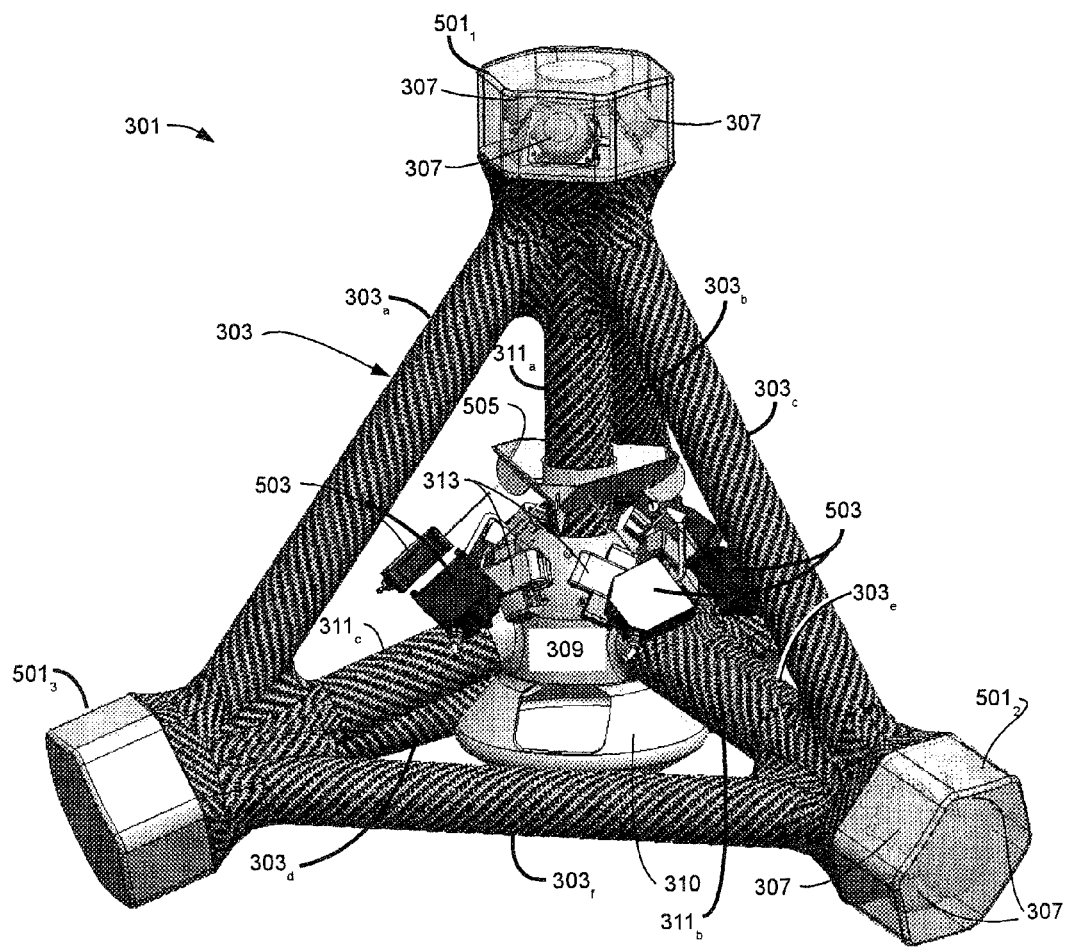
FIG. 5 is an isometric view of a rotational stage of the GGI of FIG. 3 according to an embodiment of the disclosure.

FIG. 5 is an isometric view of a rotational stage 301 for a GGI according to an embodiment of the disclosure. According to the non-limiting embodiment shown in FIG. 5, the rotational stage 301 is defined by a substantially tetrahedral lattice frame denoted generally as 303. The tetrahedral lattice comprises a number of arm members 303$_{a-f}$ which are arranged to define the edges of a tetrahedron. The edges converge to define the vertices of the tetrahedron. At each vertex, an environmental enclosure $501_{1-3}$ covers instrumentation and control circuitry, for example, accelerometers 307, included within enclosure 501. Additional circuitry or components including inertial components such as gyroscopes and/or magnetohydrodynamic sensors (MHDs) used for leveling and orienting the rotational stage 301 may also be housed therein. Other supporting electronics, for example, processors which process the accelerometer 307 output signals, power data storage and actuators may also be included as part of rotational stage 301. These additional electronics are enclosed within the rotational stage 301 by arm members $303_{a-f}$ and enclosures 501. Enclosure 501 provides an environmental barrier to protect instrumentation such as accelerometers 307. Additionally, enclosure 501 may be configured to provide a magnetic shield from external magnetic fields. Enclosure $501_1$ is disposed at the vertex defined by terminal portions of arm members $303_a$, $303_b$, and $303_c$. Enclosure $501_2$ is disposed at a vertex defined by arm members $303_c$, $303_e$, and $303_f$. Enclosure $501_3$ is disposed at a vertex defined by arm members $303_a$, $303_d$, and $303_f$.

Rotational stage 301 defines a center of mass that is located approximately at the center of the tetrahedral frame 303. A central rotational hub 309 is disposed at rotational stage's center of mass. The rotational hub 309 provides structural support for the tetrahedral frame 303, being coupled to the vertices of the tetrahedral frame 303 via arm members $311_{a-c}$ as shown in FIG. 5. Rotational hub 309 also serves as a housing for spherical bearing member 407 (shown in FIG. 4) which is coupled to the rotational stage 301 via arm member $311_a$.

Rotational hub 309 is coupled to a plurality of spherical actuators 313. Spherical actuators 313 provide rotational adjustment of rotational stage 301 relative to the linear stage. The spherical actuators 313 actively align or orient the rotational stage 301 to a desired (e.g. target) survey frame and are positioned physically or functionally between the linear stage and rotational stage 301. According to one embodiment of the disclosure, alignment between the rotational stage and the linear stage may be provided in conjunction with spherical actuators 313 by configuring one or more calibration lasers 503 coupled to the linear stage (See FIGS. 6A and 6B). The calibration lasers 503 are configured and aligned so as to project a light beam onto one or more reflectors 505 attached to the rotational stage 301. The calibration lasers 503 may include a receptor (e.g. photo detector) configured to receive the reflected light beam. A processor operatively coupled thereto receives signals from the calibration laser 503 and determines the relative alignment between the rotational stage 301 and the linear stage. Alignment between the rotational stage 301 and the linear stage may then be adjusted by the processor by transmitting a signal to spherical actuators 313 to adjust the alignment of the rotational stage 301.

As discussed herein, rotational skirt 310 extends from rotational hub 309. The rotational skirt 310 surrounds a portion of the linear stage including the spherical cup which forms a lower half of the air bearing shown in FIG. 4 in a non contacting manner. The linear stage may be configured with an extendable surface 411. The extendable surface may be threadingly engaged with a rotor incorporated in the linear stage. As the rotor is turned, the extendable surface is caused to move closer (or farther) from the rotor depending on the direction of rotation of the rotor. In this manner, the extendable surface may be extended to mechanically engage and urge against rotational skirt 310 to provide braking of the rotational stage 301.

Figure 6A:
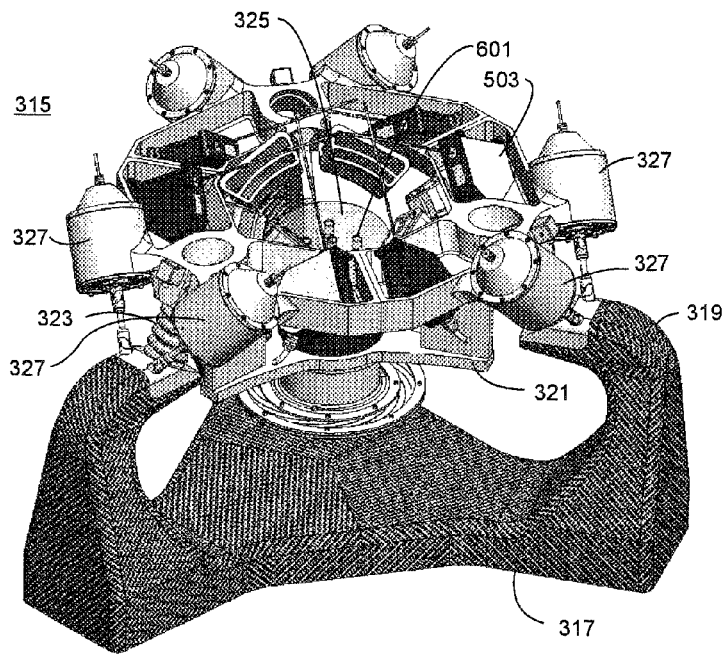
FIG. 6A and FIG. 6B are isometric and plan views of the linear stage of the GGI shown in FIG. 3 according to an embodiment of the disclosure.
Figure 6B:
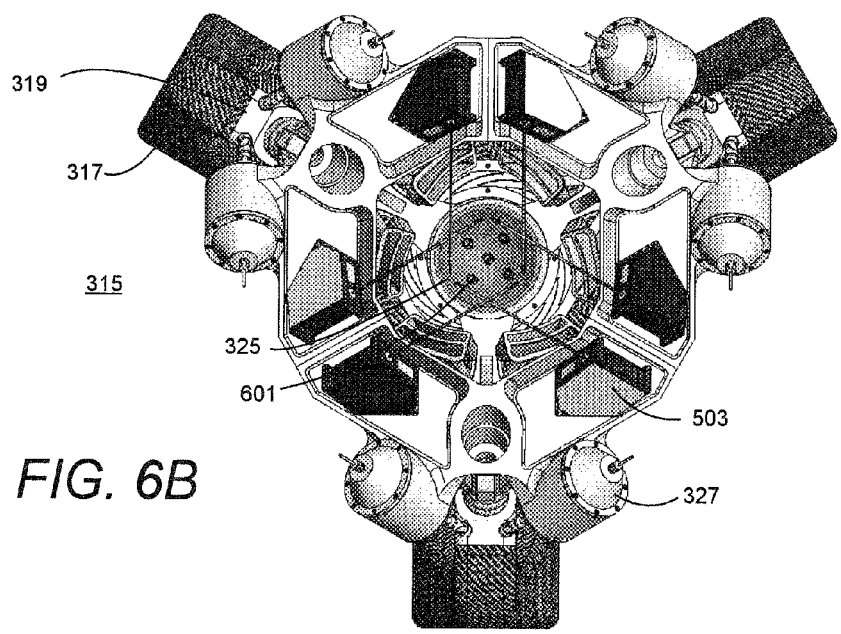

FIG. 6A and FIG. 6B are an isometric view and plan view, respectively of a linear stage plus mounting base assembly 315 according to a non-limiting embodiment of the disclosure. Mounting base 317 is directly affixed (e.g., is bolted) to the cabin floor or frame of a host vehicle or survey platform. Mounting base 317 extends upward via hook shaped extensions 319 which support the linear stage 315 via helical springs 323. By way of non-limiting example, air springs or viscoelastic dampers may also be used to provide a passive suspension system. Mounting base 317 is rigidly attached to the host vehicle or platform. In an embodiment triaxial accelerometers 307 affixed to the linear stage 315 may be used in conjunction with active suspension components in the form of mechanical actuators or stingers 327 to cancel specific, discrete, tonal disturbances that would otherwise be transmitted through the mounting base 317 and springs 323 to the linear stage 315.

The linear stage 315 contains spherical cup 325 that supports the upper half of the air bearing, comprising the spherical bearing of the rotational stage. The upper half of the spherical air bearing is supporting in a non-contacting manner by the spherical cup 325 on a cushion of air. The air is provided as pressurized air introduced to the concave surface of the spherical cup 325 through apertures 601 which pass through the cross sectional extent of the concave surface of spherical cup 325. The upper half of the spherical air bearing defines a sphere having a center that is concentric with the sphere defined by the concave surface of the spherical cup 325. Accordingly, the instrument and platform comprise a symmetric and concentric arrangement wherein the linear stage 315, rotational stage 301, inertial sensors, actuators, enclosure and passive suspension components share a common center of mass, stiffness, loading and bearing rotation. The gravity gradients measured by the GGI device are extracted from this common center point. In an embodiment, linear stage 315 may include calibration lasers 503 or other sensors used to determine the relative position and/or alignment of the rotational stage 301 to the linear stage 315.

The spherical air bearing defined by the upper spherical bearing and the spherical cup 325 in the linear stage 315 supporting the upper spherical bearing on a thin cushion of air, provides three axes of limited, but sufficient rotation in a single point configuration, via the concentric center of the upper spherical bearing and the spherical cup. This replaces the conventional solution using a series of nested gimbals and associated bearings and races, flex capsules and slip rings. Thus the gradiometer disturbance signals arising from/owing to the parasitic torques and jitter associated with these mechanical support systems may be eliminated.

In operation, linear stage 315 is secured to base 317. Base 317, in turn is secured to a host vehicle, such as an aircraft. Rotational stage 301 is positioned such that spherical bearing member 407 associated with the rotational stage 301 is engaged in spherical cup 325 associated with linear stage 315. Air or other suitable gas or fluid is introduced between the spherical bearing member 407 and the spherical cup 325 to provide a thin cushion that supports the spherical bearing member 407 and rotational stage 301 while decoupling the rotational stage 301 from the linear stage 315 and base 317.

The rotational stage 301 is aligned to a survey frame through spherical actuators 313. During the survey, accelerometers 307 measure accelerations of gravity gradients occurring in the survey frame, and produce output signals representative of the gravity gradients. The accelerometers 307 are processed as groups to process the signals to reduce or eliminate noise and produce signals that represent acceleration due to gravity gradients. The gravity gradient signals are analyzed to identify the gravity gradients in the survey frame to identify gravity gradients that may represent features of interest, for example, sub-surface geographical features which exhibit mass properties which differ from surrounding regions. The mass differential produces gravity gradients which are measured by the accelerometers of the GGI.

Thus, there is disclosed a gravity gradient instrument (GGI) that comprises: a linear stage and mounting base assembly fixedly attached to a host vehicle or platform; a rotational stage; and a spherical air bearing comprising an upper half including a spherical ball-shaped bearing of the rotational stage, and a lower half comprising a spherical cup of the linear stage, wherein the spherical ball-shaped bearing is supported by the spherical cup by a thin air cushion such that the rotational stage rotates relative to the linear stage without contacting the linear stage and is rotationally decoupled from the linear stage.

In one embodiment, the linear stage plus mounting base assembly further comprises: a mounting base fixedly attached to the host vehicle or platform, and wherein the linear stage is coupled to the base by a suspension.

In one embodiment, the suspension may be a passive suspension. The passive suspension may include at least one spring member. In one embodiment, the at least one spring member may include a mechanical helical spring or a viscoelastic air spring. In one embodiment, the passive suspension may include a wire rope suspension.

In one embodiment, the suspension may further include an active suspension. The active suspension may include at least one mechanical actuator.

The GGI may further include a brake mechanism which when activated contacts a rotational skirt coupled to the rotational stage to cause the rotational stage to stop rotating.

In one embodiment, the GGI may include a source of compressed air; and a pneumatic line having a first end coupled to the source of compressed air, and a second end coupled to an underside of the spherical cup of the linear stage. The pneumatic line may be configured to allow compressed air to pass through a concave surface of the spherical cup from the second end of the pneumatic line, through at least one aperture in the concave surface of the spherical cup.

In one embodiment, the rotational stage further comprises: an instrument block including a plurality of accelerometers; a battery power supply; a mass storage device for storing data relating to outputs of the plurality of accelerometers; a processor in communication with the mass storage device for processing data relating to outputs of the plurality of accelerometers; and an enclosure for housing the instrument block, the battery power supply, the mass storage device, and the processor. The rotational stage may further comprise at least one non-contacting spherical actuator configured to provide relative alignment between the non-contacting rotational stage and the linear stage In one embodiment, the enclosure may be configured as a magnetic shield for the plurality of accelerometers, and to provide a temperature controlled internal volume housing the plurality of accelerometers.

The GGI may further comprise an umbilical cable configured to cross an interface between the rotational stage and the linear stage, the umbilical cable configured to have minimum stiffness and a minimized routing path and effective moment arm to the rotational stage.

The GGI may further comprise at least one alignment sensor for measuring the relative position and/or alignment of the linear stage relative to the rotational stage, wherein the alignment sensor does not produce contacting between the linear stage and the rotational stage. In one embodiment the alignment sensor is an optical sensor. In one embodiment, the optical sensor is a laser coupled to the linear stage, and a reflector is coupled to the rotational stage. In one embodiment, the alignment sensor is an electromagnetic sensor.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A gravity gradient instrument (GGI) comprising:
   a linear stage and mounting base assembly fixedly attached to a host vehicle or platform;
   a rotational stage;
   a spherical air bearing comprising an upper half comprising a spherical ball-shaped bearing of said rotational stage, and a lower half comprising a spherical cup of said linear stage, wherein said spherical ball-shaped bearing is supported by said spherical cup by a thin cushion of air such that said rotational stage rotates relative to said linear stage without contacting said linear stage and is rotationally decoupled from the linear stage; and
   at least one alignment sensor configured to measure a relative position and/or alignment of said linear stage relative to said rotational stage, and send a signal based on the relative position and/or alignment of said linear stage relative to said rotational stage to a processor for aligning the relative position and/or alignment of said linear stage relative to said rotational stage.

2. The GGI of claim 1, wherein said linear stage and mounting base assembly further comprises:
   a mounting base fixedly attached to said host vehicle or platform; and
   a linear stage coupled to said base by a suspension.

3. The GGI of claim 2, wherein said suspension comprises a passive suspension.

4. The GGI of claim 3, wherein said passive suspension includes a mechanical helical spring and a damper element.

5. The GGI of claim 3, wherein said passive suspension includes a wire rope suspension.

6. The GGI of claim 3, wherein said passive suspension includes an air spring having a viscoelastic damper.

7. The GGI of claim 2, wherein said suspension comprises an active suspension.

8. The GGI of claim 7, wherein said active suspension includes at least one mechanical actuator.

9. The GGI of claim 1, further comprising:
   a source of compressed air; and
   a pneumatic line having a first end coupled to said source of compressed air, and a second end coupled to an underside of said spherical cup of said linear stage.

10. The GGI of claim 9, wherein said pneumatic line allows compressed air to pass through a concave surface of said spherical cup from said second end of said pneumatic line, through at least one aperture in said concave surface of said spherical cup.

11. The GGI of claim 1, wherein said rotational stage further comprises:
    an instrument block including a plurality of accelerometers;
    a battery power supply;
    a mass storage device for storing data relating to outputs of said plurality of accelerometers;
    a processor in communication with said mass storage device for processing data relating to outputs of said plurality of accelerometers; and
    an enclosure for housing said instrument block, said battery power supply, said mass storage device, and said processor.

12. The GGI of claim 11, wherein said enclosure is configured as a magnetic shield for said plurality of accelerometers, and wherein said enclosure provides a temperature controlled internal volume housing said plurality of accelerometers.

13. The GGI of claim 1, said rotational stage further comprising at least one non-contacting spherical actuator configured to provide relative alignment between said non-contacting rotational stage and said linear stage.

14. The GGI of claim 1 further comprising an umbilical cable configured to cross an interface between said rotational stage and said linear stage, said umbilical cable configured to have minimum stiffness and a minimized routing path and effective moment arm to said rotational stage.

15. The GGI of claim 1, wherein said alignment sensor is an optical sensor.

16. The GGI of claim 15 wherein said optical sensor is a laser coupled to said linear stage and a reflector is coupled to said rotational stage.

17. The GGI of claim 1, wherein said alignment sensor is an electromagnetic sensor.

18. The GGI of claim 1, wherein said linear stage comprises a brake mechanism which when activated includes a brake member associated with said linear stage that contacts a rotational skirt coupled to said rotational stage, said contact causing said rotational stage to stop rotating.

19. A gravity gradient instrument (GGI) comprising:
    a linear stage and mounting base assembly fixedly attached to a host vehicle or platform;
    a rotational stage;
    a spherical air bearing comprising an upper half comprising a spherical ball-shaped bearing of said rotational stage, and a lower half comprising a spherical cup of said linear stage, wherein said spherical ball-shaped bearing is supported by said spherical cup by a thin cushion of air such that said rotational stage rotates relative to said linear stage without contacting said linear stage and is rotationally decoupled from the linear stage; and
    wherein said rotational stage further comprises at least one non-contacting spherical actuator configured to provide relative alignment between said noncontacting rotational stage and said linear stage.

20. A gravity gradient instrument (GGI) comprising:
    a linear stage and mounting base assembly fixedly attached to a host vehicle or platform;
    a rotational stage;
    a spherical air bearing comprising an upper half comprising a spherical ball-shaped bearing of said rotational stage, and a lower half comprising a spherical cup of said linear stage, wherein said spherical ball-shaped bearing is supported by said spherical cup by a thin cushion of air such that said rotational stage rotates relative to said linear stage without contacting said linear stage and is rotationally decoupled from the linear stage; and
    wherein said linear stage further comprises a brake mechanism which when activated includes a brake member associated with said linear stage that contacts a rotational skirt coupled to said rotational stage, said contact causing said rotational stage to stop rotating.

* * * * *